United States Patent Office 3,455,805
Patented July 15, 1969

3,455,805
PROCESS FOR COATING SURFACES BY
ELECTRODEPOSITION
George Smith, Richmond, Clayton A. May, Orinda, Donald M. Seid, Richmond, and Ernest W. Haycock, El Cerrito, Calif., assignors to Shell Oil Company, New York, N.Y., a corporation of Delaware
No Drawing. Filed Feb. 1, 1966, Ser. No. 523,888
Int. Cl. C23b *13/02;* B01k *5/02*
U.S. Cl. 204—181                                10 Claims

ABSTRACT OF THE DISCLOSURE

Process for electrodepositing water soluble resinous material from an aqueous solution by passing current intermittently with pulse rate of 30 to 90 pulses per minute.

This invention relates to a process for coating surfaces by electrodeposition. More particularly, the invention relates to an improved process for coating surfaces with resinous materials via electrodeposition.

Specifically, the invention provides an improved process for depositing dispersed particles of a resinous material from an aqueous dispersion, emulsion or solution thereof onto an anodic or cathodic metallic substrate which comprises (1) immersing the metallic substrate to be coated in an aqueous resin dispersion and (2) passing current intermittently for a time sufficient to deposit a coating of a preselected thickness, and, optionally, (3) baking said deposited coating.

The electrodeposition of film-forming materials offers many advantages over conventional methods such as spraying, brushing or dipping because a more uniform coating is achieved. While such electrodeposited films do exhibit improved homogeneity and uniformity, the films still are not always sufficiently free of pinholes, i.e., the films are still too porous for some applications. In other words, it is very desirable to improve the "throwing power" (the evenness and completeness of deposition on all exposed surfaces of the electrode).

A process has now been found which not only improves the "throwing power" of the resinous material but also significantly reduces the porosity of the film. The instant novel process also provides more compact and more uniform films as well as avoiding or eliminating the very troublesome and undesirable "gas-popping" frequently encountered in conventional electrodepositioning processes.

It is therefore a primary object of the present invention to provide an improved electrodepositing process which produces homogeneous uniform, compact and less porous resinous films on metallic substrates. It is another object to provide an electrodepositing process wherein "gas-popping" is substantially reduced or eliminated entirely. It is a further object to provide a more efficient electrodepositing process, i.e., a process which gives a higher current efficiency. Other objects will become apparent to one skilled in the art from the following discussion and disclosure.

These and other objects are accomplished by a process for depositing dispersed particles from an aqueous dispersion on a metallic substrate by an electrodeposition method wherein the current applied is not continuous but is pulsed, i.e., the current flow is intermittent.

Any resinous material which can be effectively suspended or solubilized in an aqueous system and which may be anodically or cathodically electrodeposited may be employed in the present process. Suitable resins include thermoplastic and thermosetting resins and include, among others, alkyds, polyester, polyether, polyepoxy, solubilized epoxy resin esters, polyurethane, phenol-aldehyde, urea-formaldehyde, melamine-formaldehyde, acrylic, methacrylic, hydrocarbon and vinyl resins, including mixtures and copolymers thereof.

No attempt will be made herein to present an exhaustive or complete list of suitable resinous materials; however, a number of preferred resinous materials will be briefly discussed and described hereinafter.

It will be appreciated that the particular resinous material which may be selected for a particular application will depend upon many parameters such as, for example, voltage available, current, article to be coated, thickness of coating desired, additives necessary or desirable such as plasticizers, diluents, pigments and the like as well as the desired after-treatment such as baking temperatures, times and techniques. It will be further appreciated that such a selection may be made based on desired properties of the completed coating such as weatherability, chemical resistance, solvent resistance, flexibility and the like. It will be further appreciated that such a selection can be readily made by one skilled in the art taking into account the above-noted factors with only a routine run or test being required to ascertain the optimum conditions for the particular application and resin system in consideration.

Suitable resinous materials include the polyester resins or so-called alkyd resins and particularly the synthetic polycarboxylic acid resins having an electrical equivalent weight of from about 1,000 to 20,000, and which have been neutralized (solubilized) with a water soluble amino compound such as ammonium hydroxide or the polyfunctional amino compounds of the group consisting of hydroxy amines and polyamines.

Suitable polycarboxylic acid resins which may be solubilized with the polyfunctional amino compounds for use in the present process include the siccative oil-modified polybasic acids, aldehydes, esters or anhydrides which may be further reacted with a polymerizable vinyl monomer such as vinyl toluene, styrene, divinyl benzene, acrylic acid and esters, methacrylate and higher acrylic acids and their esters, acrylonitrile; saturated and unsaturated alkyd resins modified with siccative oils and oil-extender polyamide resins. Such resins may be a glyceride drying oil, such as linseed oil, sunflower oil, dehydrated castor oil, corn oil, tung oil and the like coupled with a polycarboxylic compound such as maleic anhydride, crotonic acid, citraconic acid or anhydride, fumaric acid, phthalic acid, succinic acid, or an acyclic olefinic aldehyde or ester of an acyclic olefinic acid such as acrolein, vinyl acetate, methyl maleate. The preparation of such siccative oil-modified polycarboxylic acid resins is described in U.S. 2,188,883, 2,188,885, 2,188,888, 2,262,923, 2,678,934, 2,285,646, 2,-820,711, 2,286,466, 2,188,890, 2,298,914 and 2,502,606.

Other carboxylic acid resin materials which may be solubilized by polyfunctional compounds to produce anode-depositable resinous materials for use in the present process may be maleinized unsaturated fatty acids, maleinized rosin acids, drying oil-extended alkyd resins derived from drying oils, glycerine and polybasic acids or anhydrides, as, for example, phthalic anhydride, such as those described in U.S. 2,369,683 and 2,384,846. Others include the acidic hydrocarbon drying oil polymers described in U.S. 2,731,481 and the acrylic and vinyl polymers and copolymers exhibiting carboxylic acid groups such as butyl acrylate/methyl methacrylate/methacrylic acid copolymers and vinyl acetate/acrylic acid copolymers. In general, these acid resins have an acid number between 30 and 300 with from about 50 to 150 being preferred.

Suitable amino compounds which may be utilized to solubilize the above-described acid resins include the water soluble hydroxy amines and polyamines, with the hydroxy amines being aliphatic at the points of hydroxyl attachment.

Suitable hydroxy amines include, among others, monoethanolamine, diethanolamine, triethanolamine, N-methyl ethanolamine, N-aminoethyl ethanolamine, N-methyl diethanolamine, monoisopropanolamine, diisopropanolamine, triisopropanolamine, hydroxylamine, butanolamine, hexanolamine, methyldiethanolamine, octanolamine, and alkylene oxide reaction products of monoamines and polyamines including the reaction product of ethylene diamine with ethylene or propylene oxide, laurylamine with ethylene oxide and the like.

Other very suitable resinous materials that may be employed in the present process include the polyester reaction products of an acid ester of an unsaturated alcohol and a polyglycol as described in U.S. 2,370,565; shellac-polyglycol reaction products described in U.S. 2,387,388; and the reaction products of acrylates and polyglycols, water-soluble polyamides, water-soluble phenol-aldehyde resins and formaldehyde-derived resins containing free hydroxyl groups as described in U.S. 2,345,543.

Still other suitable resinous materials include the water-soluble melamine-formaldehyde resins, particularly, the thermosetting polymethyl ethers of polymethylol melamines. Polymethyl ethers include the dimethyl ether, the trimethyl ether, the tetramethyl ether, the pentamethyl ether and the hexamethyl ether of polymethylol melamines. In preparing the polymethylol melamines, at least 2 moles of formaldehyde and preferably at least 3 moles of formaldehyde are reacted with each mole of melamine under conditions well known in the art. Preferred polymethyl ethers include hexamethoxymethyl melamine and hexamethoxyhexamethylol melamine. Other suitable water-soluble polymethylol melamines and their preparation are described in U.S. 2,906,724.

Still other suitable resinous materials include polytetrafluoroethylene, ether alone or in codispersions with butadiene-acrylic copolymers, butadiene-styrene copolymers, butadiene-acrylonitrile copolymers, acrylo-nitrile-butadiene-styrene terpolymers; dispersions of vinyl halide polymers and copolymers; natural rubber latices; dispersions of polymers and copolymers of acrylate or methacrylate esters; and codispersions prepared by mixing two or more of the above mixtures.

Other suitable resinous materials include the water-soluble salts of the polymers of alpha-monoolefins such as ethylene and propylene, particularly the ammonium or basic amine salts of a polymeric N-monoalkyl-substituted amic acid. Water dispersable ethylene polymers of this type are described in U.S. 2,496,989.

Other electrodepositable compounds which are suitable for use in the present process include the aqueous emulsions of rubber and cellulosic compounds such as nitrocellulose, cellulose ether and acetyl cellulose.

Very suitable resinous materials include the maleinized epoxy resin esters, which have been subsequently neutralized with ammonia (or amines such as triethylamine) up to about 90% of the calculated theoretical equivalency.

The polyepoxide materials used in preparing the epoxy resin esters comprise those organic materials which have more than one vic-epoxy group, i.e., more than one

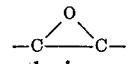

group, which group may be in a

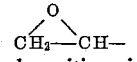

group, or in an internal position, i.e., a

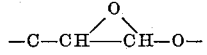

The polyepoxide may be saturated or unsaturated, aliphatic, cycloaliphatic, aromatic or heterocyclic and may be substituted with substituents such as chlorine, hydroxyl groups, ether radicals, and the like.

Examples of such polyepoxides include, among others 1,4-bis(2,3-epoxypropoxy)benzene,
1,3-bis(2,3-epoxypropoxy)benzene,
4,4'-bis(2,3-epoxypropoxy)octane,
1,4-bis(2,3-epoxypropoxy)cyclohexane,
4,4'-bis(2-hydroxy-3,4'-epoxybutoxy)diphenyl dimethylmethane,
1,3-bis(4,5-epoxypentoxy-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenols obtained by reacting the polyhydric phenol with a halogen-containing epoxide or dihalohydrin in the presence of an alkaline medium. Polyhydric phenols that can be used for this purpose include among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl)butane, 4,4' - dihydroxybenzophenone, bis(4 - hydroxyphenyl)ethane, 2,2 - bis(4 - hydroxyphenyl) - pentane 1,1,2,2 - tetrakis - (4 - hydroxyphenyl)ethane, 1,5-dihydroxynaphthalene, and that class of phenol-formaldehyde resins known as the Novolacs. The halogen-containing epoxides may be further exemplified by 3-chloro-1,2-epoxy-butane, 3-bromo-1,2-epoxy-hexane, 3-chloro-1,2-epoxy-octane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportion of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C, and D. Other suitable polyepoxides comprise the polyether F disclosed in U.S. 2,633,458. Other very suitable polyepoxides are disclosed in U.S. 2,633,458.

Polyepoxides having an epoxy equivalent weight of between 100 and 4,000 are preferred. Polyepoxides having molecular weights above 500, as for example, between about 800 and 3,100 and epoxy equivalent weights between about 90 and 2,700 are especially preferred. Very suitable polyepoxides are the glycidyl polyethers formed from an epihalohydrin, and particularly epichlorohydrin, and a polyhydric phenol, such as 2,3-bis(4-hydroxyphenyl)propane or a polyhydric alcohol such as glycerol.

The epoxy resin esters may be prepared by esterification of the above-described polyepoxides with suitable acids such as the fatty and/or rosin acids under the influence of heat. Preferred epoxy resin esters are prepared simply by esterifying polyepoxide resins with vegetable fatty acids. By a suitable choice of amount and type of fatty acid, a wide range of esters can be prepared which can be subsequently reacted with maleic anhydride and solubilized by further reaction (neutralization) with amino compounds. In general, the preparation of epoxy resin esters is similar to the preparation of alkyds and other oleoresinous vehicles and conventional cooking equipment may be used, i.e., either open or closed kettle. Both fusion and azeotropic methods may be employed. The epoxy resin esters may be made in long, medium or short oil lengths. Non-drying, semi-drying or fast drying oil acids may be used alone or in combination with rosin, dimer acids or other types of acids. The epoxy may be styrenated to obtain more rapid drying vehicles, using well-known methods similar to those in general use with alkyd resins.

Although any organic acid will react to form esters with epoxy resins, preferred acids include the fatty acids, rosin acids and tall oils, or mixtures of these acids with limited amounts of aromatic acids such as para-tertiary-butyl benzoic acid, or polybasic acids such as maleic anhydride or dimer and trimer acids.

Suitable non-drying acids include, among others, acetic acid, coconut acids, cottonseed acids, lauric acid, maleic anhydride, para-tertiary-butyl benzoic acid, rosin (dimerized), rosin (wood or gum), rosin (hydrogenated) and oil.

Suitable drying acids include dehydrated castor acids, dimer and trimer fatty acids, linseed acids, oiticica fatty acids, soy acids and tung acids.

The epoxy resin esters may be modified with one or more of the above-noted acids as well as with styrene and phenolic resins.

The relative amounts of acid and epoxy resin may vary quite widely depending upon the extent or degree of esterification desired, but, in general, because of the difficulty of obtaining a low acid number in a reasonable cooking time, an excess of epoxy resin over the theoretical equivalent required for the acid components is usually used. In general, the maximum amount of total acid employed is approximately 0.9 equivalent per equivalent of epoxy resin. Thus, the number of chemical equivalents of acid components will preferably be from about 0.1 to 0.9 equivalent of epoxy components. It will be appreciated that for computing the chemical equivalent amount of the reactants for the esterification, the epoxy group is equal to two hydroxyl groups.

As stated hereinbefore, the preparation of these epoxy esters is well known in the art and is similar to the preparation of alkyd resins.

Briefly, only heating and agitation are required and the usual method of cooking epoxy resin esters is simply to charge all the ingredients to the kettle, preferably a closed kettle, and apply full heat. When the resin has melted and the resin-acid mixture is sufficiently fluid, agitation is begun, usually when the temperature of the mixture has reached 250–300° F. Heating is continued to the top cooking temperature and held at that point until the desired acid number and viscosity are reached. Ordinarily, 500° F. is the top temperature used for esterification, however, when rosin and/or tall oil are employed, temperatures as high as 575° F. may be employed. When the desired acid number has been reached, the ester is allowed to cool to 350° F.; then it is thinned, if desired, with the proper solvent.

In both open kettle and closed kettle fusion cooking, where no azeotropic solvent is employed, the use of an inert gas sparge is desirable to improve the color properties of the ester. In closed kettle azeotropic cooking, about 2% of azeotropic solvent (xylene, etc.) based upon the initial charge weight provides adequate water removal.

The epoxy resin ester if desired can be reacted with maleic anhydride at a temperature of from about 100° C. to about 250° C., usually under nitrogen, for a period of from ½ to 1½ hours or until the viscosity is from about 100–200 poises (measured at 50° C.). In general from about 0.9 to about 0.1 chemical equivalent of maleic anhydride is employed per chemical equivalent of the residual hydroxyl functionality of the epoxy resin ester. The maleinized resin is then cooled, thinned with a suitable solvent such as butyl "Cellosolve" and the solution neutralized with ammonium hydroxide or one of the above-described amino compounds. Water is usually then added to produce a final solution having the desired viscosity and/or solids content. The solubilized, maleinized epoxy resin ester is then ready for use in the instant process.

In a like manner phthalic anhydride may be reacted with the above epoxy resin esters, which can then be solubilized for use in the present process.

Still other very suitable resinous materials include the liquid copolymers of mesityl oxide and conjugated diethylenically unsaturated hydrocarbons such as butadiene and as described in U.S. 2,986,580. These liquid copolymers may be further reacted or modified with polyepoxides (suitable polyepoxides are disclosed hereinbefore) and/or organic unsaturated cyclic anhydrides such as maleic anhydride. Other anhydrides include, among others, chloromaleic, tetrahydrophthalic, itaconic, citraconic, aconitic, dimethyl maleic, diethyl maleic, chloroglutaconic and hydroxyglutaconic anhydrides.

The preparation of such anhydride-modified and epoxy-modified mesityl oxide/diolefin liquid polymers is disclosed in U.S. 3,113,036 and U.S. 3,206,432 and the disclosures relevant to the preparation of such polymers are incorporated herein by reference. These polymers may be solubilized by any of the techniques described hereinbefore or may be employed as 5–10% dispersions as desired.

Other resinous systems include the copolymer emulsions of styrene and substituted styrene/alkyl acrylates/alpha-beta-vinylidene carboxylic acids as described in U.S. 3,202,625; U.S. 3,202,627 and U.S. 3,202,638. A very suitable composition comprises 73.5% ethyl acrylate, 2.6% methacrylic acid and 23.9% styrene.

As noted hereinbefore, the resinous composition may be dispersed or may be true solutions. If desired, an emulsion may be employed using one or more surfactants which may be nonionic, anionic or cationic. No attempt will be made herein to discuss all the surfactants which may be utilized in the present process, however, suitable anionic emulsifiers include, among others, the potassium salt or other salts of sulfuric esters, alkane sulfonic acids and alkyl aromatic sulfonic acids. Typical anionic emulsifiers include the alkali metal salt of an alkyl-aryl-polyethoxyethanol sulfate and are available commercially under the trade name of "Triton 770." Other typical anionic emulsifiers include neutral soaps of long chain fatty acids such as sodium oleate; an alkyl ester of sulfosuccinic acid salt, such as dihexyl ester of sodium sulfosuccinic acid which is available commercially under the trade name "Aerosol MA"; sodium alkyl aryl polyether sulfonate ("Triton X-200"); sodium laurylsulfate; and the salts of alkyl aryl sulfonic acid such as the ammonium salt of alkyl aryl sulfonic acid, which is available commercially under the trade name of "Emcol P 10–59."

Suitable nonionic emulsifiers are composed of a hydrophobic or hydrocarbon portion and a hydrophilic portion which is a polyether chain usually terminated with an alcoholic hydroxyl group. Generally, the hydrophilic portion will contain repeating units of, say, 7–50 ether groups and hydrocarbon moieties of, say, about 7 to 12 carbon atoms. Particularly suitable is an octylphenol-ethylene oxide condensation product which is commercially available under such trade names as "OPE-30" and "Triton X-100." Other suitable products include those made by condensing ethylene oxide with alcohols such as nonyl, dodecyl, tetradecyl or alkyl-phenyls having alkyl groups of 6 to 15 carbon atoms. The amounts of emulsifier employed will vary quite widely but will generally be in the range of from about 0.2 to 10% by weight based on total solids.

Suitable cationic surfactants include the simple amine salts, quaternary ammonium salts, amino amides and amidazolines. Such cationic surfactants preferably include, among many others, salts of fatty acid tertiary amines (Acidol 25A); N-fatty primary amines and N-difatty secondary amines (Alimine); N-fatty trimethyl quaternary ammonium chloride and N-difatty dimethyl quaternary ammonium chloride (Aliquat); substituted oxazolines; cetyl dimethyl benzyl ammonium chloride; cetyl dimethyl ethyl ammonium bromide; cetyl trimethyl ammonium bromide; acetic acid salts of n-alkyl amines; primary, secondary and tertiary amines (Armeen); di-coco-dimethyl ammonium chloride; di-soya dimethyl ammonium chloride; di-stearyl dimethyl ammonium chloride; cetyl pyridinium chloride; cetyl trimethyl ammonium stearate and lauryl dimethylbenzyldimethyl ammonium chloride.

Processes for electrodepositing resinous material on metallic substrates are well known in the art. In general, all conditions, resins, etc. which are suitable for the prior art processes are suitable for the instant process except for a most important condition, i.e., the present process is operated in such a manner that the current flow is intermittent rather than continuous.

Briefly, however, to electrodeposit resinous materials from a dispersion, a pair of electrodes is inserted in the dispersion, the electrode upon which the deposition is desired being usually the anode. An electric current which is, of course, direct current is then passed through the solution between the electrodes, the voltage and amperage being so selected as to produce the desired amount of deposition in the given interval of time. In general, a high voltage is unnecessary with an adequate flow of current being achieved at relatively low voltages, i.e., 5 to 20 volts. Voltages in excess of 200 volts are usually avoided; however, voltages of 600 volts and over may be used as desired. When the desired thickness is obtained, the coated article is then removed from the bath, washed, and generally baked.

We now turn more particularly to the present process. In order to more clearly discuss the present process it is desirable to clarify or define certain terms used in the present description wherein "pulse rate" is the number of current pulses (current passing) per minute; "duty cycle" is the percentage of the operating cycle during which current is passed and "on time" is that fraction of the total operating time during which current is passed.

Specifically, very desirable electrodepositing is achieved when the applied voltage is from 10 to 150 volts. As the applied voltage is decreased from 100 volts, the duty cycle and pulse rate become of lesser significance while the on-time becomes singularly important. At voltages from 100–150 volts, the duty cycle becomes more important. In general, voltages above 150 volts should be avoided unless the duty cycle is less than 10 or 15%, however, with certain types of materials voltages of 600 volts and over may be desirable.

At lower voltages (less than 50 volts) the pulse rate is of minor importance; however, at higher voltages (greater than 100 volts) the pulse rate is of greater importance. In any event, the pulse rate may conveniently range from 10 to 180 pulses per minute with from about 30 to 90 pulses per minute being usually preferred.

Also, at lower voltages (less than 50 volts) the particular duty cycle is relatively unimportant and may range up to 80 or 90%; however, at voltages greater than 100 volts, the duty cycle will usually be less than 50% and preferably less than 35%. A very suitable duty cycle will range from about 10 to 50%.

The amount of deposition is, of course, directly proportional to the amount of current flowing through the solution, the efficiency of the process being nearly 100%. It will be appreciated that in order to deposit a preselected thickness of resinous material in the shortest time, the current applied may be increased and the duty cycle raised accordingly. Since the duty cycle employed is preferably lower at higher voltages, it is generally preferred to operate at voltages less than 100 volts and more preferably less than 60 volts, in order to utilize the longer duty cycle.

The current density will usually range from about 0.1 to 1 ampere per square inch of electrode to be coated and more preferably between about 0.25 to 0.5 ampere/square inch. Expressed another way, the current density will preferably range from about 1 to 200 milliamperes/square centimeter.

It will be appreciated that the instant electrodeposition process can be modified in a multitude of ways without departing from the spirit or the scope of the present invention. For example, the resinous coatings may be applied using continuous current part of the coating time and using intermittent current flow part of the time. Also, the current may be continuous, then intermittent, continuous, intermittent, etc., during the coating time. Likewise, it may be desirable to utilize a small continuous current flow during the entire coating process with larger intermittent or pulsed current impressed or superimposed upon the continuous current flow. Other process schemes and adaptations will be apparent to one skilled in the electrodeposition of resinous materials taking in account all relevant factors discussed hereinbefore. For example, for some applications it may be desirable to deposit a number of resinous layers. Thus, a resinous layer may be electrodeposited upon another previously deposited resinous coating. The first or lower layer may be the same or a different resinous material than the other subsequent layers and may have been deposited by any conventional technique such as brushing, painting, dipping, etc., as well as by electrodeposition methods. The underneath layers may be baked or unbaked prior to the electrodeposition of the subsequent layers.

Because a large number of the preferable resinous materials are acidic, i.e., contain carboxyl functional groups it is usually desirable to operate the dispersion system at a pH below 8.5 and preferably between 6.0 and 8.5 although a pH of between about 5.0 and 9.5 may be employed as desired. It is important at this point to note that functional groups other than carboxyl groups such as aldehyde groups may also be present, in which case, the pH would be correspondingly adjusted or selected.

The particular resinous material is solubilized as described above in an aqueous system. It may be desirable to use, however, small amounts of other organic solvents, such as nitromethane, isopropyl alcohol, dimethyl sulfoxide, butyl "oxitol," and dimethyl formamide, among many others.

In general, the resinous dispersion will contain at least a 2% resin concentration. Preferably, the resin content will range from about 2% to 25%, although resin contents outside of this range may be employed as desired.

Additives such as pigments, surfactants, pH buffers, plasticizers, stabilizers and the like may be added to the dispersion if desired.

It is usually desirable to wash the deposited film and then bake at 150° F. to 450° F. for 2 to 60 minutes.

The invention is illustrated by the following examples. The resins, reactants and emulsifiers, their proportions and other specific ingredients are presented as being typical and various process modifications can be made in view of the foregoing disclosure without departing from the spirit or scope of the disclosure or of the claims. Unless otherwise specified, parts and percentages disclosed are by weight.

The dynamic resistivity referred to herein is a measure of the resistivity of the coating deposited on the metal panel while the coating current is being passed. This resistivity will therefore give a measure of the "throwing power" of the resin system, which is directly related to the resistance of the film deposited. The dynamic resistivity is obtained by accurately measuring the current associated with the final pulse and then simply calculating the resistance using Ohm's law. This resistance multiplied by the surface area of the coating gives the resistivity of the coating.

The other resistivity measurements noted in the examples can all be considered static measurements. The resistance measurements on the film are obtained using an A.C. impedance bridge.

EXAMPLE I

This example illustrates the superiority of the instant current "pulsing" technique over the conventional continuous current flow technique.

A dispersion of EPOK W 1762 (a water-soluble phenol-formaldehyde/alkyl resin combination; resin content, 54%; pH 7; gravity 1.03, was prepared at 10% solids content in an aqueous medium with the pH adjusted to 8.4 with $NH_4OH$. Standard cold rolled-steel panels (1" x 5") were immersed in the above solution and a constant voltage of 100 volts and an initial current of 2.5 amperes (current allowed to decay) applied for two continuous minutes. At the end of the two-minutes plating period, the wet film resistivity (ohms/cm.$^2$) was then determined. After baking the film for 30 minutes at 150° C., the film thickness, film weight and baked film resistivity was determined and the current efficiency computed.

The above procedure was then repeated except that the current was pulsed at a pulse of 30 pulses/minute at several duty cycles, i.e., at 10% and 25%. In all runs the total current passage time was two minutes.

When the current was continuous, the solution foamed and frothed and heated up rapidly to 57° F. in the two minutes with a large froth collection on the surface of the anode. When the current was pulsed, the resulting film was by visual observation much superior to non-pulsed films, i.e., more even coating, little or no froth on the surface, fewer pinholes, fewer gaps and less streaking. As shown in Table I, greater film integrity is indicated by greater film resistivity both wet and dry. Further, film thickness and current efficiency show that the pulsing process can lead to more efficient utilization of the electrical energy passing through the cell.

EXAMPLE II

The procedure of Example I was repeated using 10% by weight dispersions of the following resinous materials:
(1) Epoxy Ester A (solubilized as in Example III).
(2) Epoxy Ester B (solubilized as in Example IV).
(3) Resydrol P411 (10% solids, pH of 7.5)—A water-alcohol solution of a water-soluble alkyd-phenolic resin.
(4) A Diels-Alder adduct prepared by reacting an excess of acrolein with tung oil, said adduct having a carboxyl value of 0.230 eq./100 grams; a Gardner Color of 67; a viscosity of 1227 centistokes and a density of 0.9854 g./cm.$^3$ was adjusted to a 10% solution having a pH of 5.5.

In all experiments the initial current was 2.5 amperes. The average results of the above tests are tabulated in Table II. Because of the severe foaming and frothing, the film formed from Resydrol P411 with continuous current was too poor to evaluate adequate. Also, the wet film

TABLE I.—EFFECT OF CURRENT PULSING ON FILM QUALITY

| Volts | Pulse rate, pulses/minute | Duty cycle, percent | Dynamic wet film resistivity, Kohm/cm.$^2$ | Baked film | | | Current efficiency, grams/ampere hour |
|---|---|---|---|---|---|---|---|
| | | | | Resistivity, Kohm/cm.$^2$ | Film thickness, mils | Film weight, Grams/cm.$^2$ | |
| 100 | Continuous | | 0.875 | 2.8 | 0.1 | 1.49×10$^{-4}$ | 0.042 |
| 100 | 30 | 10 | 1.45 | 3.2 | 0.15 | 3.12×10$^{-4}$ | 0.1545 |
| 100 | 30 | 25 | 0.956 | 3.25 | 0.25 | 6.8×10$^{-4}$ | 0.512 |

TABLE II.—EFFECT OF CURRENT PULSING ON FILM QUALITY

| Resin | Volts | Pulse rate, pulses/min. | Duty cycle, percent | Wet film resistivity (Kohms/cm.$^2$) | | | | | Baked film | | | Current efficiency, grams/ampere hour |
|---|---|---|---|---|---|---|---|---|---|---|---|---|
| | | | | Dynamic | 2 min. | 5 min. | 10 min. | Washed | Resistivity, Kohm/cm.$^2$ | Film thickness, (mils) | Film weight, grams/cm.$^2$ | |
| Resydrol P411 | 100 | Continuous | | | | | | | 450 | 0.3–4.0 | 154 | 0.647 |
| | 100 | 30 | 10 | | 3.75 | 3.7 | 3.7 | 3.5 | 385 | 0.85 | 38.5 | 0.967 |
| Epoxy ester A | 60 | Continuous | | 237 | 3,950 | 790 | 790 | 790 | 1,185 | 0.2 | 11.9 | 46.9 |
| | 60 | 30 | 25 | 456 | 1,140 | 1,140 | 760 | 740 | 1,520 | 0.25 | 21.6 | 48.3 |
| | 100 | Continuous | | 380 | 3,800 | 1,520 | 1,140 | 380 | 1,900 | 0.35 | 15.2 | 44.6 |
| | 100 | 30 | 25 | 525 | 1,125 | 1,215 | 1,125 | 375 | 3,375 | 0.30 | 14.3 | 44.3 |
| Epoxy ester B | 100 | Continuous | | 39.5 | 400 | 79 | 46 | 39 | 1,185 | 1.5 | 74.1 | 0.027 |
| | 100 | 30 | 10 | 44.5 | 68 | 63 | 31 | 23 | 1,800 | 0.5 | 23.2 | 0.078 |
| | 100 | 30 | 25 | 40.5 | 120 | 120 | 67 | 34 | 2,880 | 0.7 | 26.4 | 0.048 |
| Diels-Alder adduct of Tung oil-acrolein. | 60 | | | 6.7 | 71 | 8 | 8 | 8 | 400 | 0.6 | 3.67×10$^{-3}$ | 13.6 |
| | 60 | 30 | 10 | 18 | 252 | 43 | 43 | 43 | 450 | 0.7 | 3.4×10$^{-3}$ | 19.5 | resistivity was so poor that values could not be determined and while the baked film resistivity was better in the continuous current than when pulsed, the over-all baked film was totally undesirable. Such a higher reading is due in part to the large non-uniform, charred and gas-pocked coating as noted by the five times film weight. It is also important to note that gassing at the anode was ever-present when continuous current was utilized and was much reduced or absent when the current was pulsed.

EXAMPLE III

This example illustrates the effect of "duty cycle" on the finished baked resin coating.

An epoxy resin ester was first prepared by charging 113 grams (0.4 chemical equivalents) of linseed oil fatty acids into a three-necked, round-bottom flask and heated with stirring to 160° C. Nitrogen was then passed through at a rate of 30–40 cc./minute. Then 145 grams (1.0 chemical equivalents) of a glycidyl polyether of 2,2-bis(4-hydroxyphenyl)propane having an average epoxide equivalent weight of about 450 and an average molecular weight of about 900 and the fusion (cooking) continued until an acid value of 8–11 mg. KOH/gram was obtained. The water liberated by the reaction was allowed to escape from the reaction flask through a round bent glass tube fitted on one of the necks of the flask. The preparation of the partially esterified epoxy resin took approximately 3½ hours and the viscosity of the final reaction product measured at 80° C. was less than 30 poises.

To this partial ester (approximately 250 grams) was then added 29 grams of phthalic anhydride at a temperature of about 150° C. The anhydride reaction was allowed to proceed at 165° C. under a nitrogen sparge at a rate of 30–40 cc./min. Cooking was continued until an acid value approximately equal to the sum of the acid value of the above partial ester and the acid value theoretically expected from the phthalic acid partial ester formation (acid value of 45–50). For convenience this phthalic acid partial ester will be referred to herein as "Epoxy Ester A."

Next, the phthalic acid partial ester was dissolved in 100 grams of butyl "Cellosolve" at about 80° C. The solution was allowed to cool down to 40° C. whereupon 24 grams of triethylamine was added. After thorough mixing, water was then added to bring the total solids content down to 10%. The pH of the resin solution was adjusted with NH$_4$OH to 7.8.

Two cold rolled-steel panels were immersed in the above solution and an initial current of 1 ampere and an initial voltage of 60 volts was applied to the electrodes (panels). The voltage was kept constant with the current being allowed to diminish (decay) as the coating was formed. After a total of two minutes of current flow the electrical resistance of the anode panels were evaluated and then evaluated again at 2, 5, and 10 mniutes; after washing and after baking for 30 minutes at 135° C. The results of three runs at different duty cycles are tabulated in Table III.

It is apparent that as the duty cycle is reduced, i.e., from 50% to 25% to 10%, homogeneity or uniformity of the baked film significantly improved.

EXAMPLE IV

This example illustrated the effect of pulse rate.

The procedure of Example III was essentially repeated using the identical resin solution except that both the duty cycle and pulse rate were varied and the voltage applied was 100 volts. The results of four runs are tabulated in Table IV.

It is apparent that a pulse rate of 30 pulses/minute produces a better baked film than 90 pulses/minute.

EXAMPLE V

The procedures of Examples III and IV were substantially repeated wherein the resin solution was a 10% solution of the following resinous material:

An epoxy resin ester was first prepared by charging 296 grams (1.05 chemical equivalents) of linseed oil fatty acids into a three-neck, round bottom flask and heated to 100° C. with stirring and a nitrogen sparge at a rate of 50 cc./minute. Then 145 grams (1.0 chemical equivalents) of the glycidyl polyether of 2,2-bis(4-hydroxyphenyl)propane having an average epoxide equivalent weight of about 450 and an average molecular weight of about 900 were added and the temperature raised to 200 °C. After about one hour with continuous stirring at about 300 r.p.m., the temperature was raised to 240° C. and maintained at this level until the viscosity was 8–10 poises at 50° C. and an acid value of 30 mg. KOH/gram (7 hours).

To one-hundred parts by weight of the resulting resinous material were added 7.2 parts of maleic anhydride at 120° C. under nitrogen. After one hour, the temperature was raised to 230° C. and maintained until a viscosity of 150 poises (measured at 50° C.) was obtained (approximately one hour). For convenience, this maleinized epoxy ester will be referred to herein as "Epoxy Ester B.' After cooling the mixture to about 40° C., 40 parts of butyl Cellosolve was added. The resulting solution was then neutralized (solubilized) to about 90% with ammonium hydroxide (about 11.5 parts of 25% NH$_4$OH per 100 parts of the maleinized ester). Water was added to obtain 5% solides solution. Related results were obtained.

EXAMPLE V

The procedures of Examples III and IV were essentially repeated wherein the following resinous systems were employed in a 10% solids solution (dispersion or emulsion):

(A) An emulsion comprising 73.5% ethylacrylate, 23.9% styrene and 2.6% methacrylic acid.

(B) An acrolein (75%) and acrylic acid (25%) copolymer.

(C) A sodium styrene sulfonate (30%), acrolein (40%) and acrylonitrile (30%), terpolymer.

(D) A 10% maleinized butadiene polymer having a molecular weight of about 2,500.

(E) A 2:1 ethylacrylate:methyl methacyrylate copolymer.

(F) A 60:40:1 terpolymer of vinyl acetate: vinyl Versatate 10:acrylic acid. Vinyl Versatate has the structure

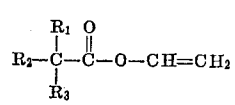

wherein R$_1$, R$_2$ and R$_3$ are saturated alkyl groups containing a total of 8 carbon atoms and is more fully described in Shell Chemical Company brochure PD 165R dated November 1964.

(G) A copolymer of dialkyl phthalate and alkyl hydrogen phthlate with an acid value of 60.

TABLE III.—EFFECT OF DUTY CYCLE

| On time (min.) | Pulse rate (pulse/min.) | Duty cycle percent | Total operating time (min.) | Voltage (volts) | Wet film resistivity (Kohm/cm.²) | | | | | Baked film resistance Kohm/cm.² | Film thickness (mils) | Current efficiency, grams/ampere hour |
| --- | --- | --- | --- | --- | --- | --- | --- | --- | --- | --- | --- | --- |
| | | | | | Dynamic | 2 min. | 5 min. | 10 min. | Washed | | | |
| 2 | 30 | 50 | 4 | 60 | 124.8 | 3,900 | 3,900 | 3,900 | 390 | 82 | 0.7 | 55.2 |
| 2 | 30 | 25 | 8 | 60 | 128 | 365.0 | 365.0 | 730 | 53.0 | 402 | 0.7 | 43.7 |
| 2 | 30 | 10 | 20 | 60 | 190 | 730 | 730 | 365 | 40.2 | 730 | 0.6 | 49.2 |

TABLE IV.—EFFECT OF PULSE RATE

| On time (min.) | Pulse rate (pulse/min.) | Duty cycle percent | Total operating time (min.) | Voltage (volts) | Wet film resistivity (Kohm/cm.²) | | | | | Baked film resistance Kohm/cm.² | Film thickness (mils) | Current efficiency grams/ampere hour |
| --- | --- | --- | --- | --- | --- | --- | --- | --- | --- | --- | --- | --- |
| | | | | | Dynamic | 2 min. | 5 min. | 10 min. | Washed | | | |
| 5 | 90 | 50 | 10 | 100 | 104 | 160 | 80 | 25.6 | 2.8 | 800 | 0.3 | 53.8 |
| 5 | 30 | 10 | 50 | 100 | 456 | 2,400 | 1,600 | 8.00 | 160 | 1,600 | 1.2 | 357.0 |
| 1 | 30 | 50 | 2 | 100 | 426.6 | 1,580 | 790 | 790 | 158 | 1,738 | 0.8 | 49.6 |
| 1 | 90 | 10 | 10 | 100 | 79.50 | 3,975.0 | 1,590 | 2,386 | 119.2 | 1,590 | 0.9 | 133.0 |

(H) A 50:40:10 terpolymer of styrene:2-ethyl hexylacrylate acrylic:acid.

(I) A 84:16 ehylene:acylic acid copolymer.

In every instance related results were obtained.

We claim as our invention:

1. An improved process for depositing a water soluble resinous material from an aqueous solution thereof onto a metal electrode substrate which comprises (1) immersing the metallic substrate to be coated in the aqueous resin solution and (2) passing current intermittently having a pulse rate of 30 to 90 pulses per minute for a total time sufficient to deposit a coating of a preselected thickness on a substrate.

2. The process of claim 1 wherein the resinous material is a solubilized thermosetting resin.

3. The process of claim 2 wherein the solubilized thermosetting resin is a maleinized epoxy resin ester prepared by esterifying a fatty acid with a glycidyl polyether of 2,2-bis(4-hydroxyphenyl)propane.

4. The process of claim 2 wherein the solubilized thermosetting resin in a phthalic anhydride half ester of a epoxy ester prepared by esterifying a fatty acid with a glycidyl polyether of 2,2-bis(4-hydroxyphenyl)propane.

5. The process of claim 1 wherein the dispersion contains from about 2 to about 25% by weight of total solids.

6. The process of claim 1 wherein the metallic substrate is the anode.

7. The process of claim 1 wherein the duty cycle ranges from about 10 to 50% and wherein the duty cycle is perpercentage of the operating time which current is passed.

8. The process of claim 1 wherein the voltage applied is less than 150 volts.

9. The process of claim 1 wherein the deposited film is subsequently washed and baked at a temperature from 150° to 450° F. for 2 to 60 minutes.

10. The process of claim 1 wherein the pH of the dispersion ranges from about 5.0 to about 9.5.

References Cited

FOREIGN PATENTS 253,085  12/1926  Great Britain.

OTHER REFERENCES

Hutchinson, "Electrocoating—A Modern Painting Method," Plating, November 1965, vol. 52, No. 11, pp. 1133–1137.

JOHN H. MACK, Primary Examiner

A. C. PRESCOTT, Assistant Examiner

U.S. Cl. X.R.

204—180